(12) United States Patent
Lee

(10) Patent No.: US 11,474,570 B2
(45) Date of Patent: Oct. 18, 2022

(54) HINGE STRUCTURE FOR FOLDABLE DEVICE HAVING FLEXIBLE DISPLAY PANEL

(71) Applicant: Kyung Hee Lee, Seoul (KR)

(72) Inventor: Kyung Hee Lee, Seoul (KR)

(*) Notice: Subject to any disclaimer, the term of this patent is extended or adjusted under 35 U.S.C. 154(b) by 0 days.

(21) Appl. No.: 17/501,564

(22) Filed: Oct. 14, 2021

(65) Prior Publication Data

US 2022/0121248 A1    Apr. 21, 2022

(30) Foreign Application Priority Data

Oct. 16, 2020    (KR) .................. 10-2020-0134346

(51) Int. Cl.
*G06F 1/16* (2006.01)
*G09F 9/30* (2006.01)

(52) U.S. Cl.
CPC .......... *G06F 1/1681* (2013.01); *G06F 1/1652* (2013.01); *G09F 9/301* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,379,378 B2* | 2/2013 | Visser | ................. | H04M 1/0268 16/385 |
| 8,971,031 B2* | 3/2015 | Mok | ................... | H04M 1/0216 361/679.27 |
| 9,179,559 B1* | 11/2015 | Kim | .................... | H05K 5/0004 |
| 9,250,733 B2* | 2/2016 | Lee | ...................... | H04M 1/0268 |
| 9,348,450 B1* | 5/2016 | Kim | ........................ | G06F 1/1616 |
| 9,696,763 B2* | 7/2017 | Mok | .................... | H04M 1/0268 |
| 10,480,225 B1* | 11/2019 | Hsu | ............................. | E05D 3/12 |
| 10,495,941 B2* | 12/2019 | Hashimoto | ........... | G06F 3/0421 |
| 10,664,021 B1* | 5/2020 | Hsu | ........................ | G06F 1/1681 |
| 10,761,574 B1* | 9/2020 | Hsu | ........................ | G06F 1/1626 |
| 10,775,852 B2* | 9/2020 | Kim | ........................ | G06F 1/1641 |
| 11,061,445 B2* | 7/2021 | Kim | ........................ | H04M 1/022 |
| 11,068,032 B2* | 7/2021 | Huang | ................. | G06F 1/1616 |
| 11,073,863 B2* | 7/2021 | Kim | ........................ | G06F 1/1652 |
| 11,122,155 B2* | 9/2021 | Mok | ........................ | G06F 1/1681 |
| 11,245,782 B2* | 2/2022 | Hong | .................... | G06F 1/1616 |
| 11,334,122 B2* | 5/2022 | Hsu | ........................ | F16C 11/04 |
| 11,340,663 B2* | 5/2022 | Kim | ........................ | G06F 1/1616 |
| 11,353,931 B2* | 6/2022 | Hsu | ........................ | G06F 1/1681 |
| 2020/0401193 A1* | 12/2020 | Hsu | ........................ | F16M 11/22 |
| 2021/0234107 A1* | 7/2021 | Soh | ..................... | H01L 27/3244 |
| 2022/0091635 A1* | 3/2022 | Ou | ........................ | G06F 1/1616 |
| 2022/0121248 A1* | 4/2022 | Lee | ........................ | G06F 1/1681 |
| 2022/0192037 A1* | 6/2022 | Han | ........................ | B01D 46/58 |

FOREIGN PATENT DOCUMENTS

KR    1020200011100    2/2020

* cited by examiner

*Primary Examiner* — Lisa Lea-Edmonds
(74) *Attorney, Agent, or Firm* — IPLA P.A.

(57) ABSTRACT

A hinge structure for a foldable device having a flexible display panel is proposed. The hinge structure includes first and second devices, a hinge housing having a U-shaped section, with a space being defined therein, and configured such that first ends of the first and second devices are rotatably coupled to both ends of the hinge housing by hinge shafts, and a flexible display panel configured such that a first fixing part on a first side and a second fixing part on a second side, except for a bending part that is a part of a central portion, are fixed to upper surfaces of the first device and the second device, respectively.

8 Claims, 5 Drawing Sheets

HINGE STRUCTURE FOR FOLDABLE DEVICE HAVING FLEXIBLE DISPLAY PANEL

CROSS REFERENCE

The present application claims priority to Korean Patent Application No. 10-2020-0134346, filed Oct. 16, 2020, the entire contents of which are incorporated herein for all purposes by this reference.

BACKGROUND

The present disclosure relates to a hinge structure for a foldable device having a flexible display panel. More particularly, the present disclosure relates to a hinge structure for a foldable device having a flexible display panel, in which two devices connected to each other to be foldable are rotatably connected to a hinge housing having a space therein, so the flexible display panel is kept flat when the flexible display panel is unfolded, and a folded bending part is accommodated in the space while maintaining a limit curvature radius, when the flexible display panel is folded.

With the development of display technology, a flexible display is proposed, and is applied to an existing LCD display, OLED display, etc. to develop a very thin and light flexible Ultra-Thin Glass (UTG).

Further, a foldable device configured to be folded using a flexible display allows a flexible display panel to be greatly reduced in curvature radius, which is the limit point of curvature when a display screen is bent, compared to the prior art, and prevents the flexible display panel from being damaged even after repeated folding and unfolding, thereby reducing a gap of a folded portion of the flexible display panel as narrow as possible.

However, the flexible display panel is problematic in that it has a bending limit, i.e., a limit curvature radius, so that the display device may be damaged when bent beyond the limit curvature radius. In order to solve the problem, only a specific portion of the display device is configured to be bent, and a device for ensuring a curvature limit when the display panel being bent is used. However, the conventional device for ensuring the curvature limit is problematic in that it is difficult to produce due to a complicated structure, or it is heavy or bulky due to many components.

As the related art of the present disclosure, Korean Patent Application Publication No. 10-2020-0011100 entitled "Hinge structure for foldable device equipped with flexible display panel" (Patent Document 1) has been proposed. According to the related art, the hinge structure for the foldable device equipped with the flexible display panel includes a folding part 4 that is disposed on a central portion and includes two folding modules 6 that are folded and unfolded; an upper panel 10 that is attached to each of left and right sides of an upper portion of the folding module 6; an outer casing 8 that accommodates the folding part 4 therein and is coupled to the upper panel 8, and a flexible display panel 2 that is disposed on the upper panel 10.

However, the related art is problematic in that a pair of upper panels 10 should be spaced apart from each other without completely contacting with each other so as to maintain the limit curvature radius of a folded portion when the flexible display panel is folded, thus leading to an increase in thickness.

(Patent Document 1) Korean Patent Application Publication No. 10-2020-0011100 "Hinge structure for foldable device equipped with flexible display panel"

SUMMARY OF THE INVENTION

Accordingly, the present disclosure has been made keeping in mind the above problems occurring in the related art, and an objective of the present disclosure is to provide a hinge structure for a foldable device having a flexible display panel, in which a bending part is folded within a limit curvature radius when the flexible display panel is folded, thus preventing the flexible display panel from being damaged, and a gap between devices is minimized, thus reducing a thickness, and it is simple in structure and can be operated with a small number of components, thus realizing a reduction in weight and volume.

In order to achieve the objective of the present disclosure, the present disclosure provides a hinge structure for a foldable device having a flexible display panel, including a first device; a second device; a hinge housing having a U-shaped section, with a space being defined therein, and configured such that first ends of the first device and the second device are rotatably coupled to both ends of the hinge housing by hinge shafts, respectively; and a flexible display panel configured such that a first fixing part on a first side and a second fixing part on a second side, except for a bending part that is a part of a central portion, are fixed to upper surfaces of the first device and the second device, respectively, whereby, when the first device and the second device are unfolded, the flexible display panel may be unfolded to be flat over the first device and the second device, and, when the first device and the second device are folded, the bending part of the flexible display panel may be folded such that the first fixing part and the second fixing part are parallel to each other, and the bending part may be accommodated in the space of the hinge housing while maintaining a curvature.

The separate connecting parts may protrude from central portions in a widthwise direction of the first ends of the first device and the second device, respectively, and the connecting parts may be rotatably connected to the hinge shafts.

The hinge shafts may be provided on both lines each forming an angle of 45 degrees with a central portion in a widthwise direction of the flexible display panel, when the first device and the second device are horizontally unfolded.

Further, upper support parts may protrude from upper portions of first ends of the first device and the second device, support members that are flat on tops thereof may be rotatably connected at first ends thereof to the upper support parts via the hinge shafts, respectively, whereby, when the first device and the second device are unfolded, an upper end of a sidewall of the hinge housing may support a lower surface of each of the support members, and when the first device and the second device are folded, the support members may be rotated to be accommodated in the space.

Further, guide parts having curved inner sidewalls may be formed on both sidewalls of the hinge housing so that there are narrow in upper sections and are widened in a direction from an upper position to a lower position, so, when the first device and the second device are folded, lower surfaces of the support members may slide along the curved surfaces of the guide parts to be folded.

Further, lower support parts may protrude from lower portions of the first device and the second device, and a lower portion of an outside of the sidewall of the hinge housing may be recessed to form step parts, whereby, when the first device and the second device are unfolded, ends of the lower support parts may be supported by the step parts formed on the lower portion of the sidewall of the hinge housing, thus keeping the flexible display panel flat without exceeding 180 degrees.

Further, cover parts each protruding in a curved shape may be formed on the lower portion of the sidewall of the hinge housing, and outer surfaces of the cover parts may be in contact with inner surfaces of the lower support parts, so, when the first and second devices are folded, the cover parts may slide to eliminate a gap and thereby prevent inflow of impurities.

Further, gears may be provided on the connecting parts, located outside the flexible display panel in a plan view at both ends in a longitudinal direction of the hinge housing so that the gears do not rotate, and intermediate gears may be provided between the gears to rotatably engage with the gears, so, when the first device and the second device are rotated, the intermediate gears allow the first gear of the first device to be simultaneously rotated at the same angle.

The hinge structure for a foldable device having a flexible display panel according to the present disclosure is advantageous in that a space is defined in a hinge housing, so it is possible to secure a space into which a folded portion is inserted into the hinge housing in the state of maintaining a curvature, when the flexible display panel is folded in conjunction with a rotating shaft, and the flexible display panel can be folded to a thickness corresponding to the thickness of both devices, thus reducing the thickness without a gap, and it is simple in structure and can be operated with a small number of components, thus realizing a reduction in weight and volume, and it is possible to prevent the flexible display panel from being broken even if folding operations are repeated.

BRIEF DESCRIPTION OF THE DRAWINGS

The above and other objectives, features, and other advantages of the present disclosure will be more clearly understood from the following detailed description when taken in conjoint with the accompanying drawings, in which:

FIG. 3 is a side view showing a state in which FIG. 1 is rotated and folded.

FIG. 7 is a side view showing a state in which FIG. 5 is rotated and folded.

DETAILED DESCRIPTION OF THE INVENTION

Although a preferred embodiment of the present disclosure will be described in detail with reference to the accompanying drawings, the embodiment is illustrative for the purpose of understanding the present disclosure, but is not intended to limit the present disclosure.

Hereinafter, the preferred embodiment of the present disclosure will be described in detail.

Figure 1:
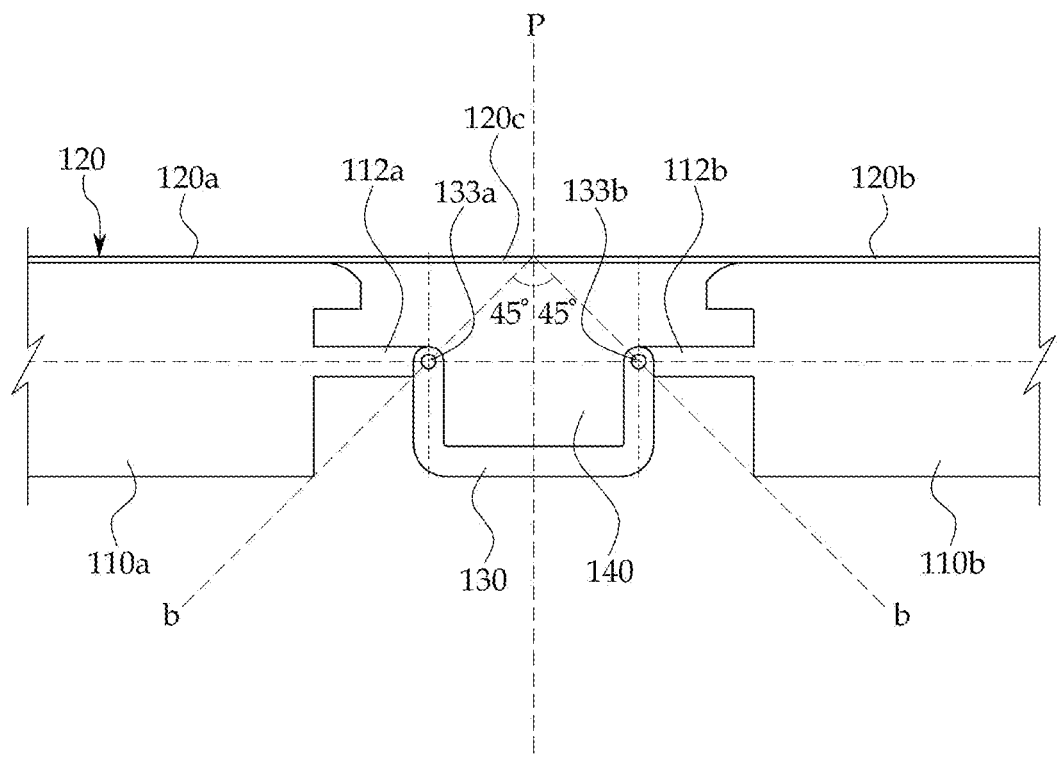
FIG. 1 is a side view showing a state in which a flexible display panel is flat, in a hinge structure for a foldable device having a flexible display panel according to the present disclosure.
Figure 2:
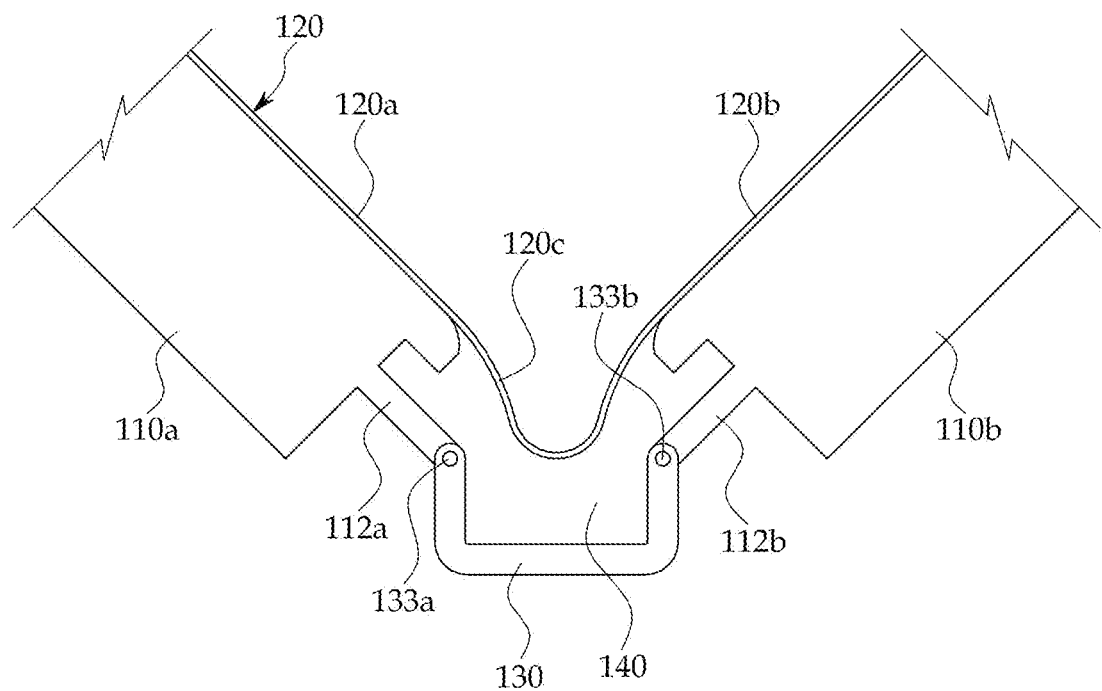
FIG. 2 is a side view showing the operating state of FIG. 1.
Figure 3:
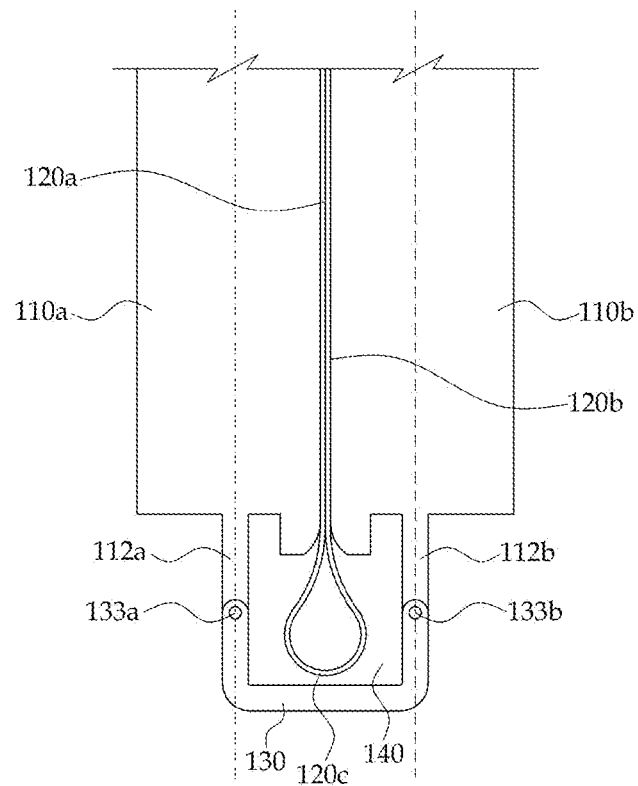

FIG. 1 is a side view showing a state in which a flexible display panel is flat, in a hinge structure for a foldable device having a flexible display panel according to the present disclosure, FIG. 2 is a side view showing the operating state of FIG. 1, and FIG. 3 is a side view showing a state in which FIG. 1 is rotated and folded.

As shown in FIG. 1, the hinge structure for the foldable device having the flexible display panel according to the present disclosure is configured such that it is separated into a first device 110*a* and a second device 110*b* to be folded as in a general foldable device, and one flexible display panel 120 is provided on the first device 110*a* and the second device 110*b*. When the first device 110*a* and the second device 110*b* are folded, the flexible display panel 120 is folded.

Particularly, according to the present disclosure, when ends of the first device 110*a* and the second device 110*b* are rotatably connected to hinge shafts 133*a* and 133*b*, respectively, in a U-shaped hinge housing 130 to be folded or unfolded, the first device 110*a* and the second device 110*b* are rotated about the hinge shafts 133*a* and 133*b* of the hinge housing 130 to be folded or unfolded.

Further, as shown in the drawing, the flexible display panel 120 is composed of three parts, i.e. a first fixing part 120*a* that is attached to a surface of the first device 110*a*, a second fixing part 120*b* that is attached to a surface of the second device 110*b*, and a bending part 120*c* that is bent at a predetermined curvature radius and then unfolded when the first device 110*a* and the second device 110*b* are folded or unfolded by two hinge shafts 133*a* and 133*b* of the hinge housing 130.

The hinge housing 130 has a U-shaped section, with a space 140 defined therein. Such a hinge housing 130 is configured such that first ends of the first device 110*a* and the second device 110*b* are rotatably coupled to both ends of the sidewall of the hinge housing by the hinge shafts 133*a* and 133*b*, thus allowing the first device 110*a* and the second device 110*b* to be horizontally unfolded or be folded such that they face each other.

As shown in FIG. 1, the flexible display panel 120 is configured such that the first fixing part 120*a* on a first side and the second fixing part 120*b* on a second side, except for the bending part 120*c* that is a part of a central portion, are fixed to upper surfaces of the first device 110*a* and the second device 110*b*, respectively. When the first device 110*a* and the second device 110*b* are horizontally unfolded or are folded to face each other, they are operated in conjunction with each other.

When the first device 110*a* and the second device 110*b* are folded as shown in FIGS. 2 and 3, the hinge housing 130 causes the first and second devices to be accommodated in the space 140 holding the bending part 120*c* that is changed in curvature radius. The first device 110*a* and the second device 110*b* are in close contact with each other as shown in FIG. 3, so a display 120*a* and a display 120*b* come into close contact with each other and the bending part 120*c* is accommodated in an inner space 140 of the hinge housing 130 while maintaining a limit curvature radius.

As shown in FIG. 3, when the first device 110*a* and the second device 110*b* are folded, a distance between the hinge shaft 133*a* and the hinge shaft 133*b* is set such that the first device 110*a* and the second device 110*b* are folded to be parallel while being as close as possible. To this end, separate connecting parts 112a and 112b protrude from central portions in a widthwise direction of first ends of the first device 110a and the second device 110b, respectively. The connecting parts 112a and 112b are rotatably connected to the hinge shafts 133a and 133b.

Figure 4:
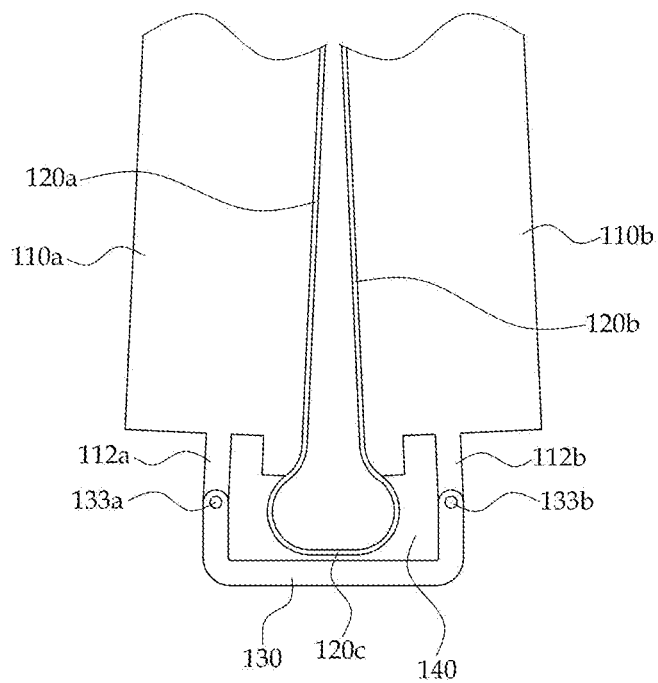
FIG. 4 is a side view showing a space created when two devices are not completely folded.

FIG. 4 is a side view showing a space created when two devices are not completely folded.

If a distance between two hinge shafts 133a and 133b is greater than a distance between two first and second devices 110a and 110b, the devices do not come into close contact with each other when the devices are folded as shown in FIG. 4, thus undesirably creating an empty space. This space causes the folded devices to be thicker, and causes the first device 110a and the second device 110b not to be parallel to each other, thus preventing the first and second devices from coming closer to each other.

The distance between the hinge shafts 133a and 133b provided in the hinge housing 130 may vary depending on the thicknesses of the first device 110a, the second device 110b, and the flexible display panel 120, and is set to prevent a space from remaining so that the first device 110a and the second device 110b maintain a state in parallel as much as possible when the first and second devices are folded.

As shown in FIG. 1, the positions of the two hinge shafts 133a and 133b should be on bisectors b with the angle of 45 degrees between a vertical imaginary line p having the center of the flexible display as a starting point and a point where the imaginary line p meets the flexible display panel 120 in a state where the flexible display panel 120 is flat. Thus, if the hinge is present at a position less than the angle of 45 degrees, the hinge is not folded when the devices are folded. On the other hand, if the hinge is at a position more than the angle of 45 degrees, the hinge is folded but the first device 110a and the second device 110b are not folded, thus creating a gap therebetween and thereby causing an increase in thickness.

Thus, as described above, the two hinge shafts 133a and 133b should be preferably on the bisectors b having an angle of 45 degrees with respect to the central vertical line. Further, the bending part 120c that is a part folded when the devices are folded secures a space, and should be preferably equal to a thickness between rotating shafts of the two devices when the two devices come into close contact with and overlap each other, in order for the bending part to go into and out of the inner space 140 defined in the hinge housing when the devices are folded and unfolded, thus allowing the devices to be in close contact with each other without a space when the devices are folded.

Figure 5:
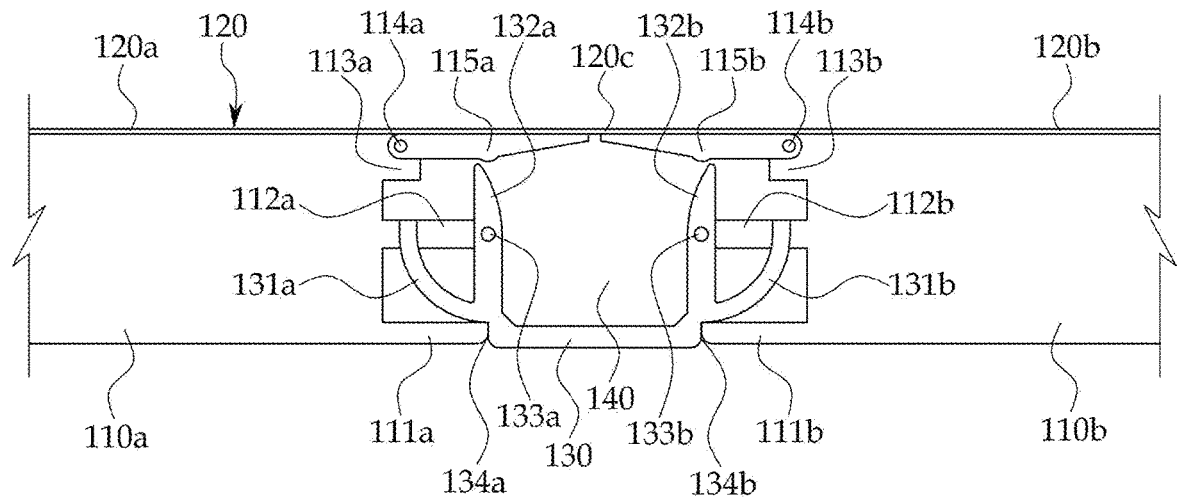
FIG. 5 is a side view showing another embodiment of FIG. 1.
Figure 6:
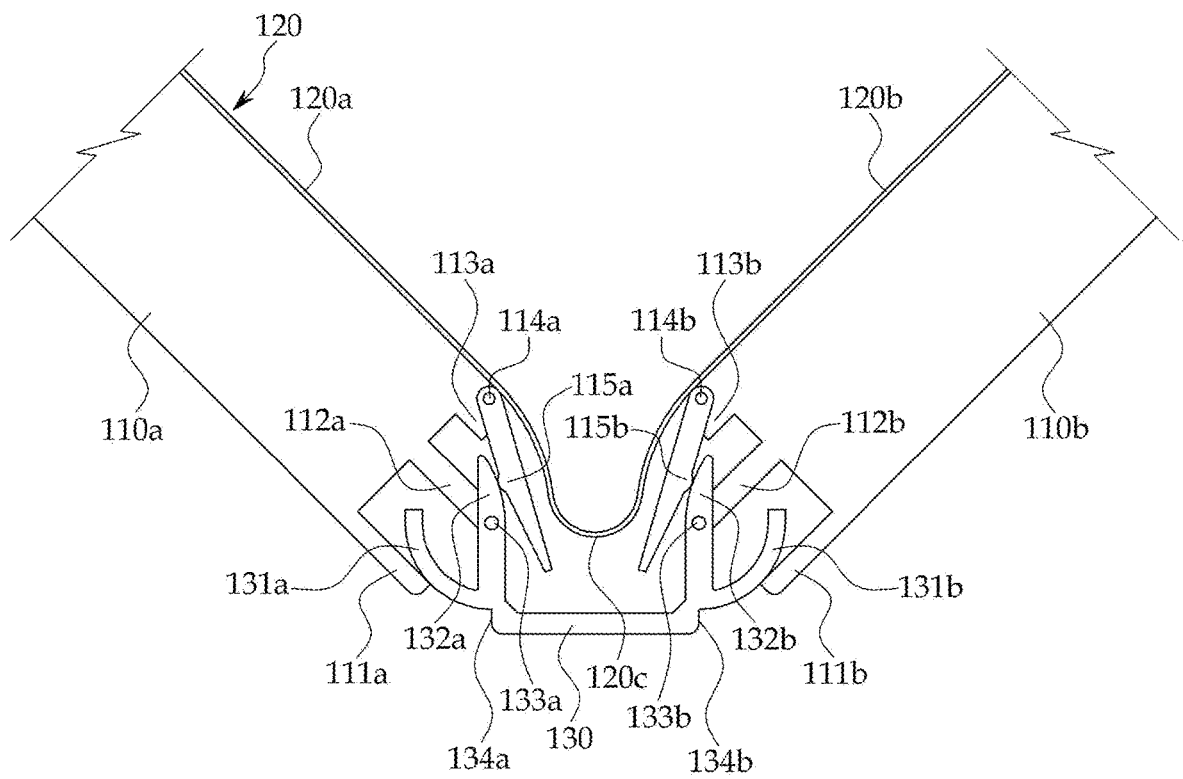
FIG. 6 is a side view showing the operating state of FIG. 5.
Figure 7:
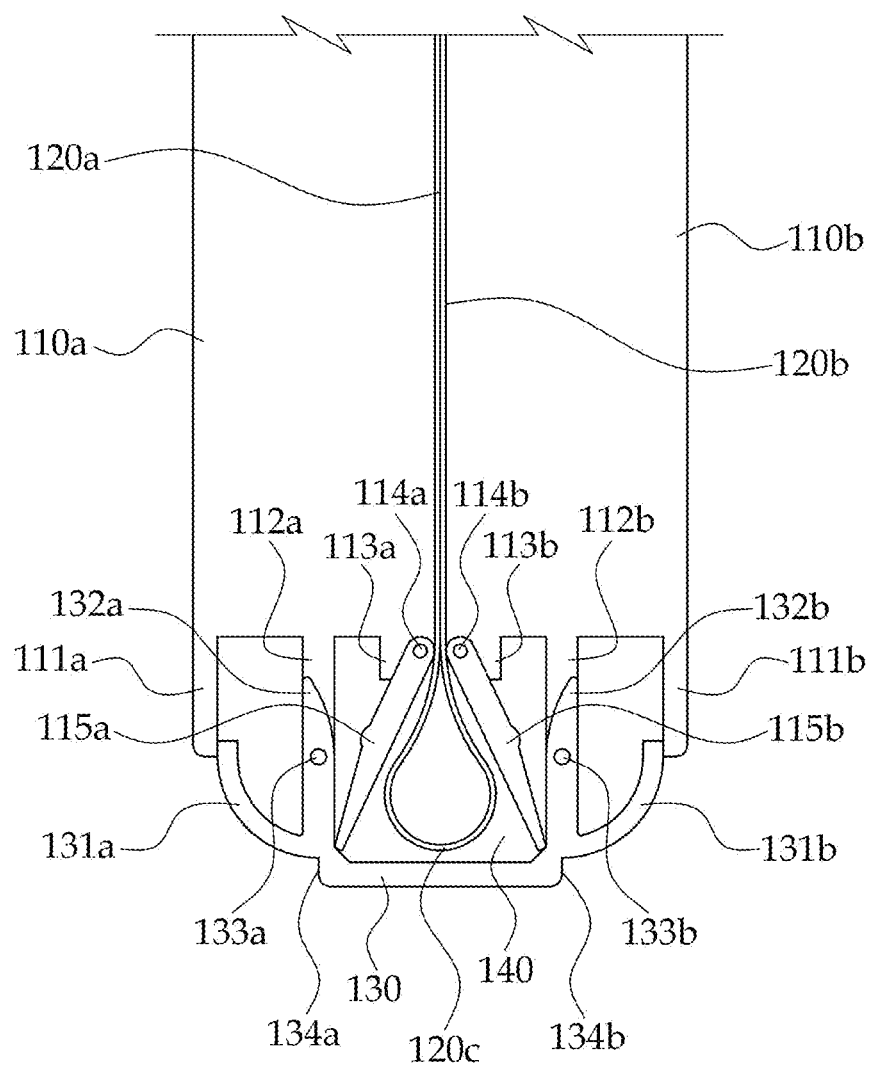
Figure 8:
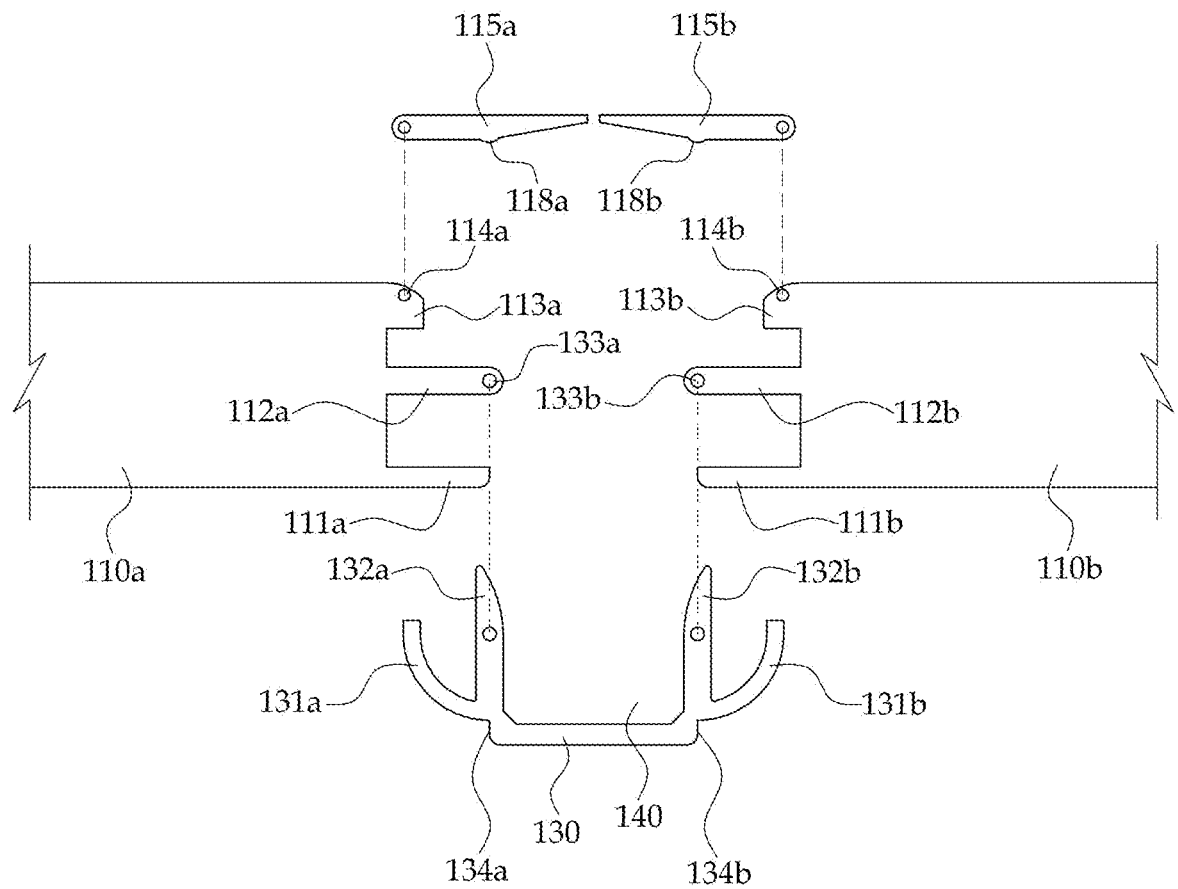
FIG. 8 is an exploded view of FIG. 5.

FIG. 5 is a side view showing another embodiment of FIG. 1, FIG. 6 is a side view showing the operating state of FIG. 5, FIG. 7 is a side view showing a state in which FIG. 5 is rotated and folded, and FIG. 8 is an exploded view of FIG. 5.

When the first device 110a and the second device 110b are horizontally unfolded, the first device 110a and the second device 110b are spaced apart from each other. In a state where the flexible display panel 120 is unfolded, there is no structure for supporting the lower portion of the bending part 120c, so it may not be stable.

Therefore, according to the present disclosure, as shown in FIG. 5, when a user uses the flexible display panel 120 with it being unfolded, the lower portion of the bending part 120c of the flexible display panel 120 is supported from pressure of a hand or a touch pen and is protected by support members 115a and 115b, thus supporting the flexible display panel 120 and thereby stably keeping the flexible display panel flat. When the flexible display panel is folded, the support members 115a and 115b are also folded so that the bending part 120c of the flexible display panel 120 is accommodated in the space 140 defined in the hinge housing 130.

To this end, upper support parts 113a and 113b protrude from upper portions of first ends of the first device 110a and the second device 110b. The support members 115a and 115b that are flat on tops thereof are rotatably connected at first ends thereof to the upper support parts 113a and 113b via the hinge shafts 114a and 114b, so the support members may be rotated as shown in FIG. 6.

Particularly, in order to facilitate the rotation of the support members 115a and 115b, guide parts 132a and 132b having curved inner sidewalls are formed on both sidewalls of the hinge housing 130 so that they are narrow in upper sections and are widened in a direction from an upper position to a lower position. When the first device 110a and the second device 110b are unfolded, the upper end of the sidewall of the hinge housing 130 supports the lower surfaces of the support members 115a and 115b. When the first device 110a and the second device 110b are folded, the support members 115a and 115b rotate about the hinge shafts 114a and 114b as shown in FIGS. 6 and 7. The lower surfaces of the support members 115a and 115b slidably move along the curved surfaces of the guide part 132a and 132b, so a gap between the support members 115a and 115b is naturally open and thereby the bending part 120c is inserted into the space 140 defined in the hinge housing 130. When the devices are unfolded, it can be seen that they are operated in a direction opposite to the above-described direction.

Particularly, locking protrusions 118a and 118b protrude from central portions of the lower surfaces of the support members 115a and 115b. Thus, when the devices are unfolded, the locking protrusions 118a and 118b are located inside the inner sidewall of the hinge housing 130 to be locked thereto. Meanwhile, when the devices are folded, a contact area may be kept to a minimum such that the locking protrusions 118a and 118b slide naturally along the guide parts 132a and 132b on the inner sidewall of the hinge housing 130.

Furthermore, when the devices are folded as shown in FIG. 6, springs may be accommodated in the upper support parts 113a and 113b of the first device 110a and the second device 110b having the hinge shafts 114a and 114b to cause the support members 115a and 115b to be always in close contact with the guide parts 132a and 132, thus allowing the flexible display panel 120 to be folded and unfolded without damage.

When the first device 110a and the second device 110b are unfolded to form a plane, the first fixing part 120a, the second fixing part 120b, and the bending part 120c should form 180 degrees therebetween to form a plane. Accordingly, in order to always keep the components flat, lower support parts 111a and 111b protrude from the lower portions of the first device 110a and the second device 110b, and the lower portion of the outside of the sidewall of the hinge housing 130 is recessed to form step parts 134a and 134b. Thus, when the first device 110a and the second device 110b are unfolded, the ends of the lower support parts 111a and 111b are supported by the step parts 134a and 134b formed on the lower portion of the sidewall of the hinge housing 130, thus always keeping the flexible display panel 120 flat without exceeding 180 degrees.

Cover parts 131a and 131b each protruding in a curved shape are formed on the lower portion of the sidewall of the hinge housing 130, and the outer surfaces of the cover parts 131a and 131b are in contact with the inner surfaces of the lower support parts 111a and 111b. Thus, when the devices are folded as shown in FIG. 6, the cover parts 131a and 131b slide to eliminate a gap and thereby prevent the inflow of impurities. In the folded state as shown in FIG. 7, when the devices rotate about the rotating shafts 133a and 133b of the hinge housing, the cover parts are in close contact with the devices.

Figure 9:
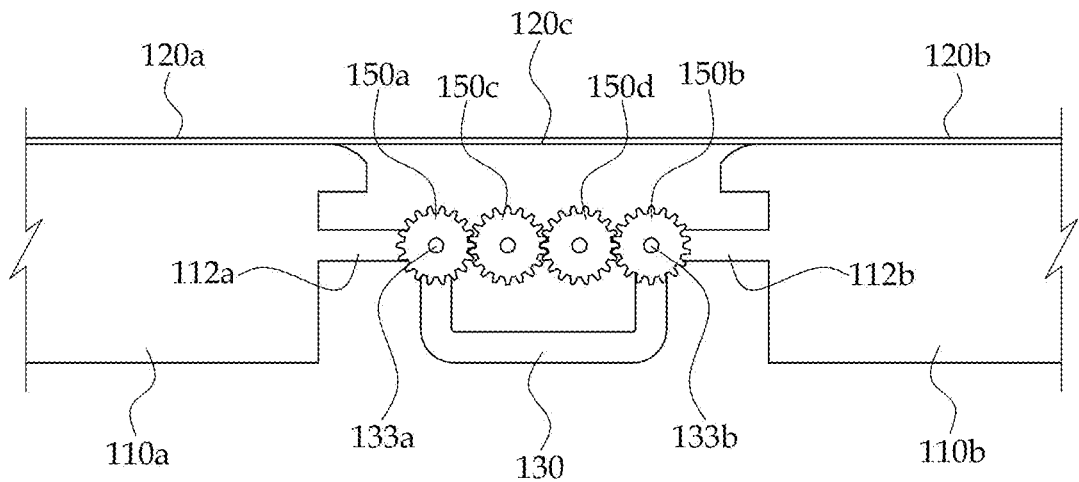
FIG. 9 is a side view showing a state in which two devices are connected via gears to be always folded at the same angle.

Referring to FIG. 9, when two devices are attached to two hinges, respectively, to be rotated, the devices may be folded or unfolded while forming a bilateral symmetry. To this end, in order for the flexible display panel 120 to be always maintained within a limit curvature radius when the first device 110a and the second device 110b are folded and unfolded about the two hinges, the two devices are connected via gears to transmit the rotation of one device to the other device. Such a modified flexible display can be protected while maintaining the bilateral symmetry.

As shown in FIG. 9, gears 150a and 150b are provided on the hinge shafts 133a and 133b of the connecting parts 112a and 112b not to rotate, and intermediate gears 150c and 150d are provided between the gears 150a and 150b to rotatably engage with the gears 150a and 150b. Thus, when the first device 110a and the second device 110b are rotated, the rotating forces of the devices are transmitted via the two intermediate gears 150c and 150d.

Since the first gear 150a is fixed when the first device 110a is rotated, the rotating force is transmitted through the intermediate gears 150c and 150d to the second gear 150b, so the devices are folded or unfolded at the same angle. Likewise, since the second gear 150b is not rotated and is fixed when the second device 110b is rotated, the rotating force is transmitted through the intermediate gears 150c and 150d to the first gear 150a of the first device 110a, so the first device is simultaneously rotated at the same angle.

As such, four gears 150a, 150b, 150c, and 150d rotated in conjunction with each other are provided on the outside of the flexible display panel 120 in a plan view at both ends in the longitudinal direction of the hinge housing 130, thus allowing the bending part 120c of the flexible display panel 120 to be accommodated in the space 140 without being disturbed by the gears 150a, 150b, 150c, and 150d.

The gears are a two-way rotation transmitting device that causes an angle to be always constant when the first device 110a and the second device 110b are folded or unfolded, thus allowing the bending part 120c to always maintain a bilateral symmetry and thereby protecting the flexible display panel 120 to be always maintained within a limit curvature radius.

The space 140 maintaining a constant curvature radius when the flexible display panel 120 is folded allows the hinge housing 130 to be deformed in various round shapes including a U shape so as to keep the shape of the flexible display panel 120 constant. This may be adjusted depending on the limit curvature radius of the flexible display.

As described above, the present disclosure provides a hinge structure for a foldable device having a flexible display panel, in which a space is defined in a hinge housing, so it is possible to secure a space into which a folded portion is inserted into the hinge housing in the state of maintaining a curvature, when the flexible display panel is folded in conjunction with a rotating shaft, and the flexible display panel can be folded to a thickness corresponding to the thickness of both devices, thus reducing the thickness without a gap, and it is simple in structure and can be operated with a small number of components, thus realizing a reduction in weight and volume, and it is possible to prevent the flexible display panel from being broken even if folding operations are repeated.

Although the present disclosure was described with reference to specific embodiments shown in the drawings, it is apparent to those skilled in the art that the present disclosure may be changed and modified in various ways without departing from the scope of the present disclosure, which is described in the following claims.

What is claimed is:

1. A hinge structure for a foldable device having a flexible display panel, the hinge structure comprising:
    a first device;
    a second device;
    a hinge housing having a U-shaped section, with a space being defined therein, and configured such that first ends of the first device and the second device are rotatably coupled to both ends of the hinge housing by hinge shafts, respectively; and
    a flexible display panel configured such that a first fixing part on a first side and a second fixing part on a second side, except for a bending part that is a part of a central portion, are fixed to upper surfaces of the first device and the second device, respectively,
    whereby, when the first device and the second device are unfolded, the flexible display panel is unfolded to be flat over the first device and the second device, and, when the first device and the second device are folded, the bending part of the flexible display panel is folded such that the first fixing part and the second fixing part are parallel to each other, and the bending part is accommodated in the space of the hinge housing while maintaining a curvature.

2. The hinge structure of claim 1, wherein the separate connecting parts protrude from central portions in a widthwise direction of the first ends of the first device and the second device, respectively, and the connecting parts are rotatably connected to the hinge shafts.

3. The hinge structure of claim 1, wherein the hinge shafts are provided on both lines each forming an angle of 45 degrees with a central portion in a widthwise direction of the flexible display panel, when the first device and the second device are horizontally unfolded.

4. The hinge structure of claim 2, wherein upper support parts protrude from upper portions of first ends of the first device and the second device, support members that are flat on tops thereof are rotatably connected at first ends thereof to the upper support parts via the hinge shafts, respectively, whereby, when the first device and the second device are unfolded, an upper end of a sidewall of the hinge housing supports a lower surface of each of the support members, and
    when the first device and the second device are folded, the support members are rotated to be accommodated in the space.

5. The hinge structure of claim 4, wherein guide parts having curved inner sidewalls are formed on both sidewalls of the hinge housing so that there are narrow in upper sections and are widened in a direction from an upper position to a lower position, so, when the first device and the second device are folded, lower surfaces of the support members slide along the curved surfaces of the guide parts to be folded.

6. The hinge structure of claim 4, wherein lower support parts protrude from lower portions of the first device and the second device, a lower portion of an outside of the sidewall of the hinge housing is recessed to form step parts, whereby, when the first device and the second device are unfolded, ends of the lower support parts are supported by the step parts formed on the lower portion of the sidewall of the hinge housing, thus keeping the flexible display panel flat without exceeding 180 degrees.

7. The hinge structure of claim 4, wherein cover parts each protruding in a curved shape are formed on the lower portion of the sidewall of the hinge housing, and outer surfaces of the cover parts are in contact with inner surfaces of the lower support parts, so, when the first and second devices are folded, the cover parts slide to eliminate a gap and thereby prevent inflow of impurities.

8. The hinge structure of claim 1, wherein gears are provided on the connecting parts, located outside the flexible display panel in a plan view at both ends in a longitudinal direction of the hinge housing so that the gears do not rotate, and intermediate gears are provided between the gears to rotatably engage with the gears, so, when the first device and the second device are rotated, the intermediate gears allow the first gear of the first device to be simultaneously rotated at the same angle.

* * * * *